(12) United States Patent
Park et al.

(10) Patent No.: US 10,015,684 B2
(45) Date of Patent: Jul. 3, 2018

(54) METHOD AND APPARATUS FOR MANAGING SPECIFIC RESOURCE IN WIRELESS COMMUNICATION SYSTEM

(71) Applicant: LG ELECTRONICS INC., Seoul (KR)

(72) Inventors: Seungkyu Park, Seoul (KR);
Seongyun Kim, Seoul (KR);
Hongbeom Ahn, Seoul (KR);
Seungmyeong Jeong, Seoul (KR);
Heedong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 216 days.

(21) Appl. No.: 15/100,582

(22) PCT Filed: Nov. 11, 2014

(86) PCT No.: PCT/KR2014/010793
§ 371 (c)(1),
(2) Date: May 31, 2016

(87) PCT Pub. No.: WO2015/080401
PCT Pub. Date: Jun. 4, 2015

(65) Prior Publication Data
US 2016/0302085 A1    Oct. 13, 2016

Related U.S. Application Data

(60) Provisional application No. 61/910,421, filed on Dec. 1, 2013, provisional application No. 61/914,911, filed
(Continued)

(51) Int. Cl.
*H04W 24/02* (2009.01)
*H04L 29/08* (2006.01)
(Continued)

(52) U.S. Cl.
CPC ............ *H04W 24/02* (2013.01); *H04L 67/303* (2013.01); *H04W 4/70* (2018.02); *H04W 88/12* (2013.01)

(58) Field of Classification Search
CPC .... H04W 24/02; H04W 88/12; H04L 67/303; H04L 67/32; H04L 67/34
See application file for complete search history.

(56) References Cited

U.S. PATENT DOCUMENTS

2002/0010798 A1* 1/2002 Ben-Shaul .......... G06F 17/3089
709/247
2003/0204582 A1* 10/2003 Shimoda ............. H04L 67/1095
709/223
(Continued)

FOREIGN PATENT DOCUMENTS

| WO | WO 2012/069997 A1 | 5/2012 |
| WO | WO 2012/109531 A2 | 8/2012 |
| WO | WO 2013/168911 A1 | 11/2013 |

OTHER PUBLICATIONS

ETSI, "Machine-to-Machine communications (M2M); Functional architecture," Technical Specification, ETSI TS 102 690 V2.1.1, Oct. 2013, pp. 1-332.

*Primary Examiner* — Dung B Huynh
(74) *Attorney, Agent, or Firm* — Birch, Stewart, Kolasch & Birch, LLP

(57) ABSTRACT

Disclosed is a method for notifying an attribute of an original resource of one entity to another entity in a wireless communication system according to one embodiment of the present invention. The method may comprise the steps of: receiving an update request for an 'announcedAttribute' attribute comprising a list of pre-notified attributes included in the original resource, for notifying a specific attribute of the original resource, wherein each attribute in the original resource is set to one of a mandatory announced (MA) type
(Continued)

that should be notified mandatorily, an optional announced (OA) type that is optionally notified according to the contents of the specific attribute in the original resource, and a not announced (NA) type that is not notified; determining whether the specific attribute is the OA type; and notifying the specific attribute to all notified resources of the original resource if the specific attribute is the OA type.

10 Claims, 16 Drawing Sheets

Related U.S. Application Data on Dec. 11, 2013, provisional application No. 61/937,593, filed on Feb. 9, 2014, provisional application No. 62/004,877, filed on May 29, 2014.

(51) Int. Cl.
*H04W 4/70* (2018.01)
*H04W 88/12* (2009.01)

(56) References Cited

U.S. PATENT DOCUMENTS

| | | | |
|---|---|---|---|
| 2004/0255048 A1* | 12/2004 | Lev Ran | G06F 9/546 709/249 |
| 2007/0220096 A1* | 9/2007 | Silver | G06Q 10/107 709/206 |
| 2008/0069001 A1* | 3/2008 | Aschauer | H04L 67/104 370/238 |
| 2013/0103842 A1 | 4/2013 | Seed et al. | |
| 2013/0336222 A1* | 12/2013 | Lu | H04W 4/005 370/328 |
| 2014/0007076 A1* | 1/2014 | Kim | G06F 8/65 717/173 |
| 2014/0075004 A1* | 3/2014 | Van Dusen | H04L 41/04 709/223 |
| 2014/0233473 A1* | 8/2014 | Lu | H04L 67/16 370/329 |
| 2015/0245161 A1* | 8/2015 | Pareglio | H04W 4/005 455/435.1 |
| 2016/0192111 A1* | 6/2016 | Choi | H04W 76/022 455/507 |
| 2016/0366716 A1* | 12/2016 | Bhalla | H04W 4/005 |
| 2017/0099562 A1* | 4/2017 | Bhalla | H04W 4/005 |

* cited by examiner

METHOD AND APPARATUS FOR MANAGING SPECIFIC RESOURCE IN WIRELESS COMMUNICATION SYSTEM

CROSS REFERENCE TO RELATED APPLICATIONS

This application is the National Phase of PCT/KR2014/010793 filed on Nov. 11, 2014, which claims priority under 35 U.S.C. § 119(e) to U.S. Provisional Application Nos. 61/910,421 filed on Dec. 1, 2013; 61/914,911 filed on Dec. 11, 2013; 61/937,593 filed on Feb. 9, 2014; and 62/004,877 filed on May 29, 2014, all of which are hereby expressly incorporated by reference into the present application.

TECHNICAL FIELD

The present invention relates to a method and apparatus for managing a specific resource in a wireless communication system.

BACKGROUND ART

As the ubiquitous era took off, machine to machine (M2M) communication has attracted much attention. The M2M communication technology is under study in many standardization organizations such as TIA, ATIS, ETSI, and oneM2M. In an M2M environment, communication may be conducted between a plurality of M2M applications (network application/gateway application/device application), and different entities may manage an M2M server part (e.g., a common service entity (CSE)) and an application on a network side (e.g., a network application). Accordingly, it is essential to access resources of the different entities.

In this context, the present invention is intended to provide a method for efficiently enabling access to resources.

DISCLOSURE

Technical Problem

An object of the present invention devised to solve the problem is to provide a procedure for managing access to a specific resource in a wireless communication system.

The objects to be achieved by the present invention are not limited to the above-described objects and those skilled in the art may consider other objects from the following description of the embodiments of the present invention.

Technical Solution

In an aspect of the present invention, provided herein is a method for announcing an attribute of an original resource of an entity to another entity in a wireless communication system, including receiving an update request for an 'announcedAttribute' attribute including a list of announced attributes of the original resource, for announcing a specific attribute of the original resource, each attribute of the original resource being set to one of a mandatory announced (MA) type that is to be announced mandatorily, an optional announced (OA) type that is optionally announced according to the contents of the attribute in the original resource, and a not announced (NA) type that is not announced, determining whether the specific attribute is the OA type, and announcing the specific attribute to all announced resources of the original resource, if the specific resource is the OA type.

Additionally or alternatively, the update request may include a name of the specific attribute.

Additionally or alternatively, the update request may include a name and a value of the specific attribute.

Additionally or alternatively, the method may further include receiving a response to the creation request; and adding a name of the specific attribute to the 'announcedAttribute' attribute, if the response to the creation request indicates successful creation.

Additionally or alternatively, the method may further include transmitting a response to the update request, after the name of the specific attribute is added to the 'announcedAttribute' attribute, and the response to the update request may include the 'announcedAttribute' attribute added with the specific attribute.

In another aspect of the present invention, a method for, when an attribute of an original resource of an entity has been announced to another entity, de-announcing the attribute of the original resource in a wireless communication system includes receiving an update request for an 'announcedAttribute' attribute including a list of announced attributes of the original resource, for de-announcing a specific attribute of the original resource, each attribute of the original resource being set to an MA type that is to be announced mandatorily, an OA type that is optionally announced according to the contents of the attribute in the original resource, and an NA type that is not announced, determining whether the specific attribute is the OA type, and de-announcing the specific attribute to all announced resources of the original resource, if the specific resource is the OA type.

Additionally or alternatively, the method may further include receiving a response to the deletion request, and deleting a name of the specific attribute from the 'announcedAttribute' attribute, if the response to the deletion request indicates successful deletion.

Additionally or alternatively, the method may further include transmitting a response to the update request, after the name of the specific attribute is deleted from the 'announcedAttribute' attribute, and the response to the update request may include the 'announcedAttribute' attribute from which the specific attribute is deleted.

In another aspect of the present invention, a method for creating a child resource of a specific resource announced to another entity among original resources of an entity in a wireless communication system includes transmitting a request for creating the child resource to one of a first device having the original resources and a second device having the specific announced resource, and receiving a response to the request. A type of the child resource to be created may change depending on whether the request is transmitted to the first device or the second device.

Additionally or alternatively, if the child resource to be created has an announced resource type of the original resource, the request may be transmitted to the first device, and if the child resource to be created has a general resource type, the request may be transmitted to the second device.

In another aspect of the present invention, an apparatus for announcing an attribute of an original resource of an entity to another entity in a wireless communication system includes a radio frequency (RF) unit, and a processor configured to control the RF unit. The processor may be configured to receive an update request for an 'announcedAttribute' attribute including a list of announced attributes of the original resource, for announcing a specific attribute of the original resource, each attribute of the original resource being set to one of an MA type that is to be announced mandatorily, an OA type that is optionally announced according to the contents of the attribute in the original resource, and an NA type that is not announced, to determine whether the specific attribute is the OA type, and to announce the specific attribute to all announced resources of the original resource, if the specific resource is the OA type.

In another aspect of the present invention, an apparatus for, when an attribute of an original resource of an entity has been announced to another entity, de-announcing the attribute of the original resource in a wireless communication system includes an RF unit, and a processor configured to control the RF unit. The processor may be configured to receive an update request for an 'announcedAttribute' attribute including a list of announced attributes of the original resource, for de-announcing a specific attribute of the original resource, each attribute of the original resource being set to an MA type that is to be announced mandatorily, an OA type that is optionally announced according to the contents of the attribute in the original resource, and an NA type that is not announced, to determine whether the specific attribute is the OA type, and to de-announce the specific attribute to all announced resources of the original resource, if the specific resource is the OA type.

In another aspect of the present invention, an apparatus for creating a child resource of a specific resource announced to another entity among original resources of an entity in a wireless communication system includes an RF unit, and a processor configured to control the RF unit. The processor may be configured to transmit a request for creating the child resource to one of a first device having the original resource and a second device having the specific announced resource, and to receive a response to the request. A type of the child resource to be created may change depending on whether the request is transmitted to the first device or the second device.

The above technical solutions are mere parts of the embodiments of the present invention, and those skilled in the art will derive and understand various embodiments reflecting technical features of the present invention based on the following detailed description of the present invention.

Advantageous Effects

According to an embodiment of the present invention, the efficiency of accessing resources in a wireless communication system can be increased.

The effects of the present invention are not limited to the above-described effects and other effects which are not described herein will be understood by those skilled in the art from the following description of the embodiments of the present invention.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
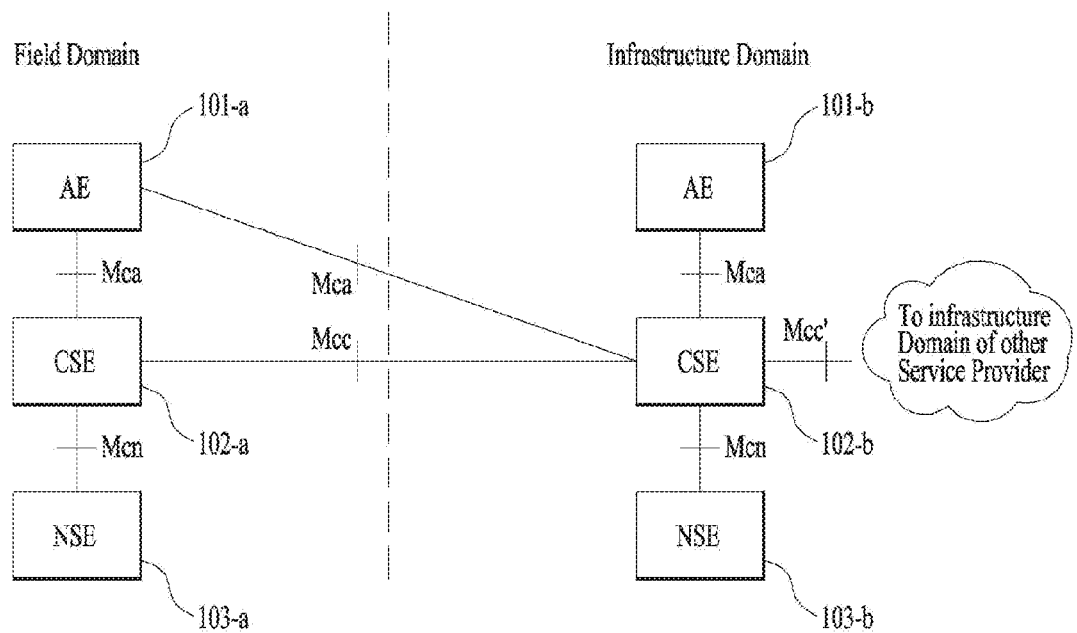
FIG. 1 illustrates a functional structure of a machine to machine (M2M) communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
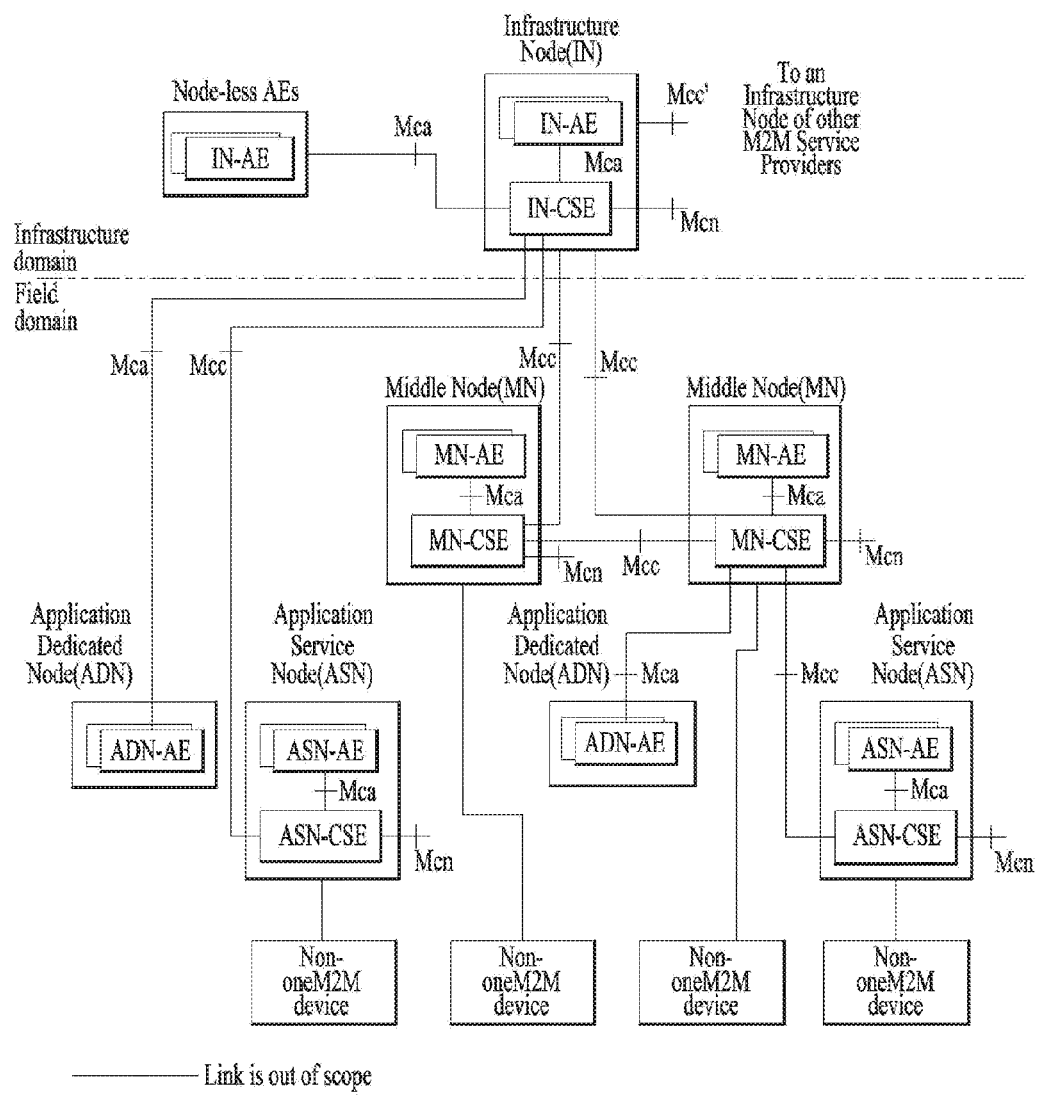
FIG. 2 is a block diagram of a configuration supported based on the M2M functional structure by the M2M communication system.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:

one or more ASNs;
one or more middle nodes (MNs); and
one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:

one or more middle nodes; and/or
one or more application service nodes.

The IN may communicate with one or more ADNs over one or more Mca reference points.

Figure 3:
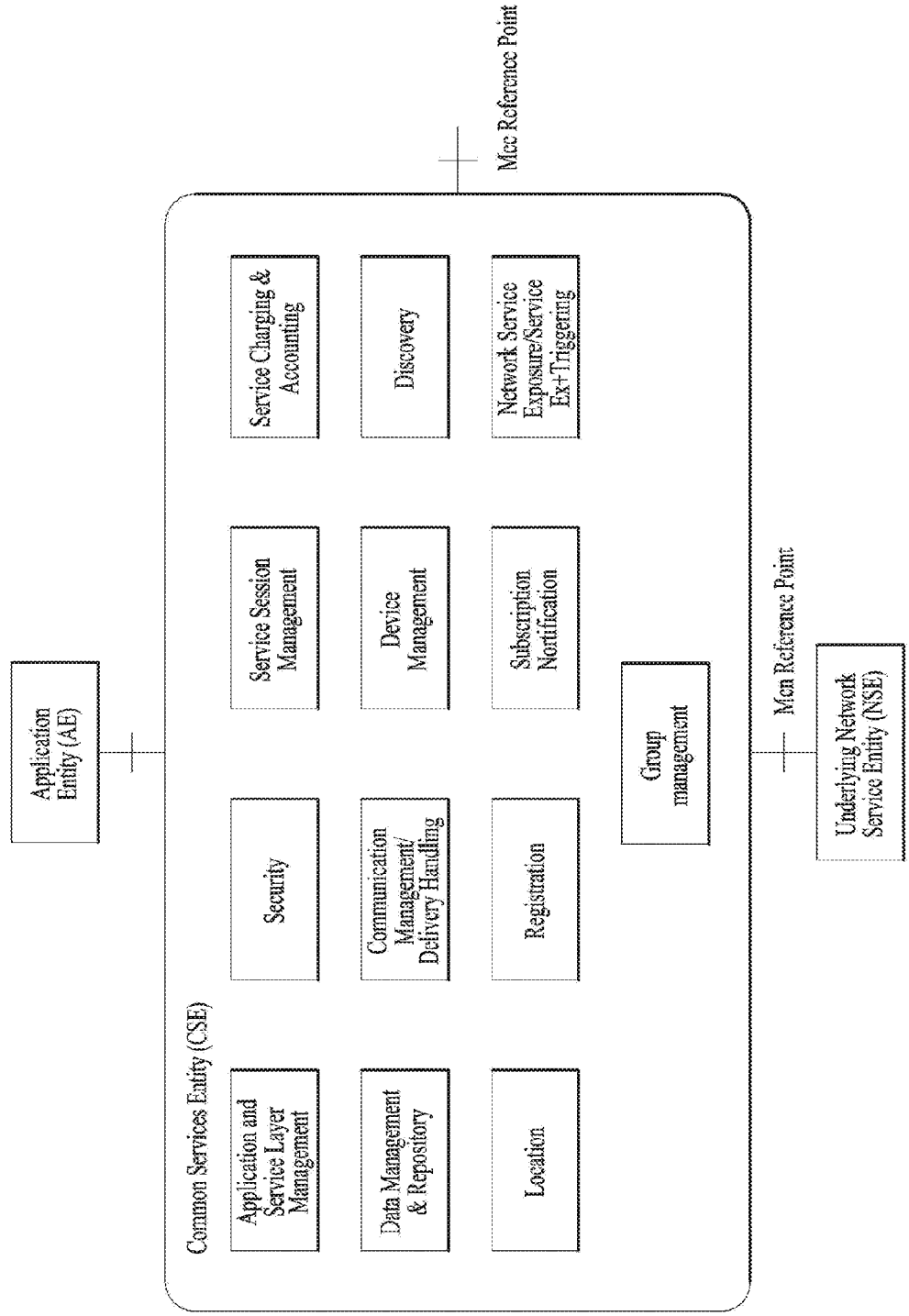
FIG. 3 illustrates a common services function (CSF) provided by the M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network(or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

Figure 4:
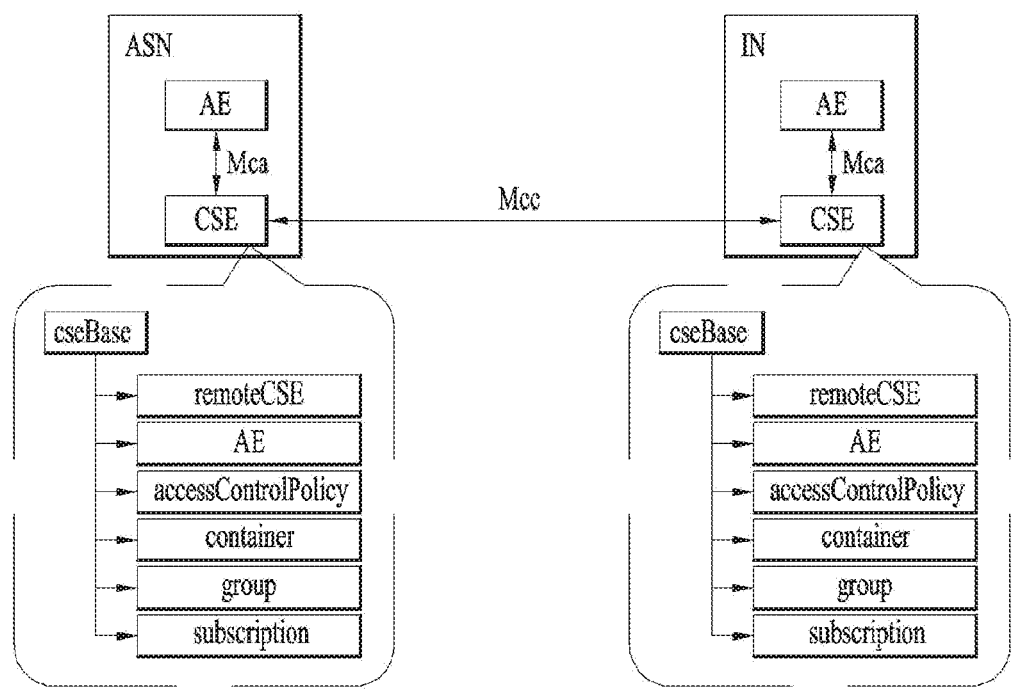
FIG. 4 illustrates resource structures in an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
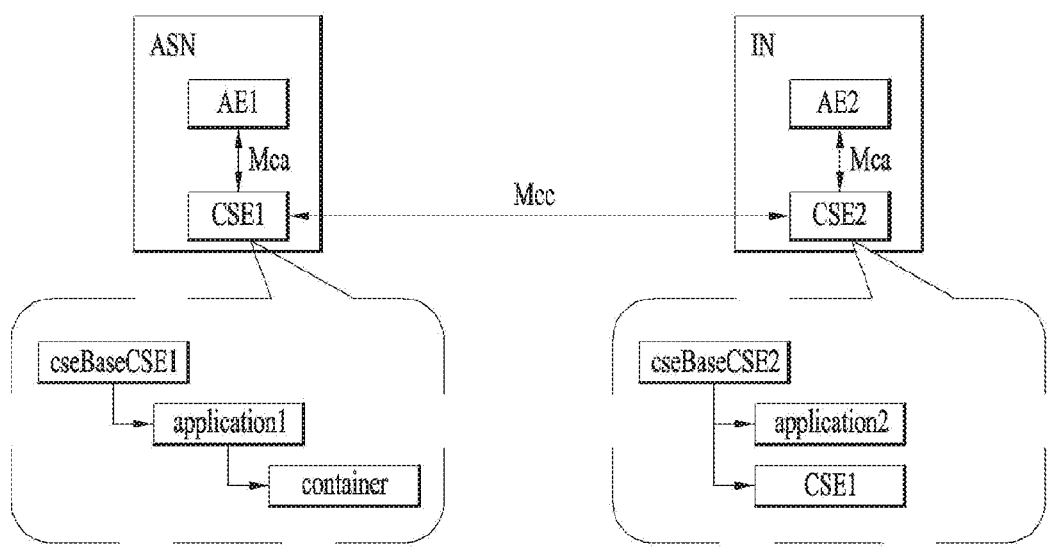
FIG. 5 illustrates resource structures in an M2M application service node (e.g., an M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

Figure 6:
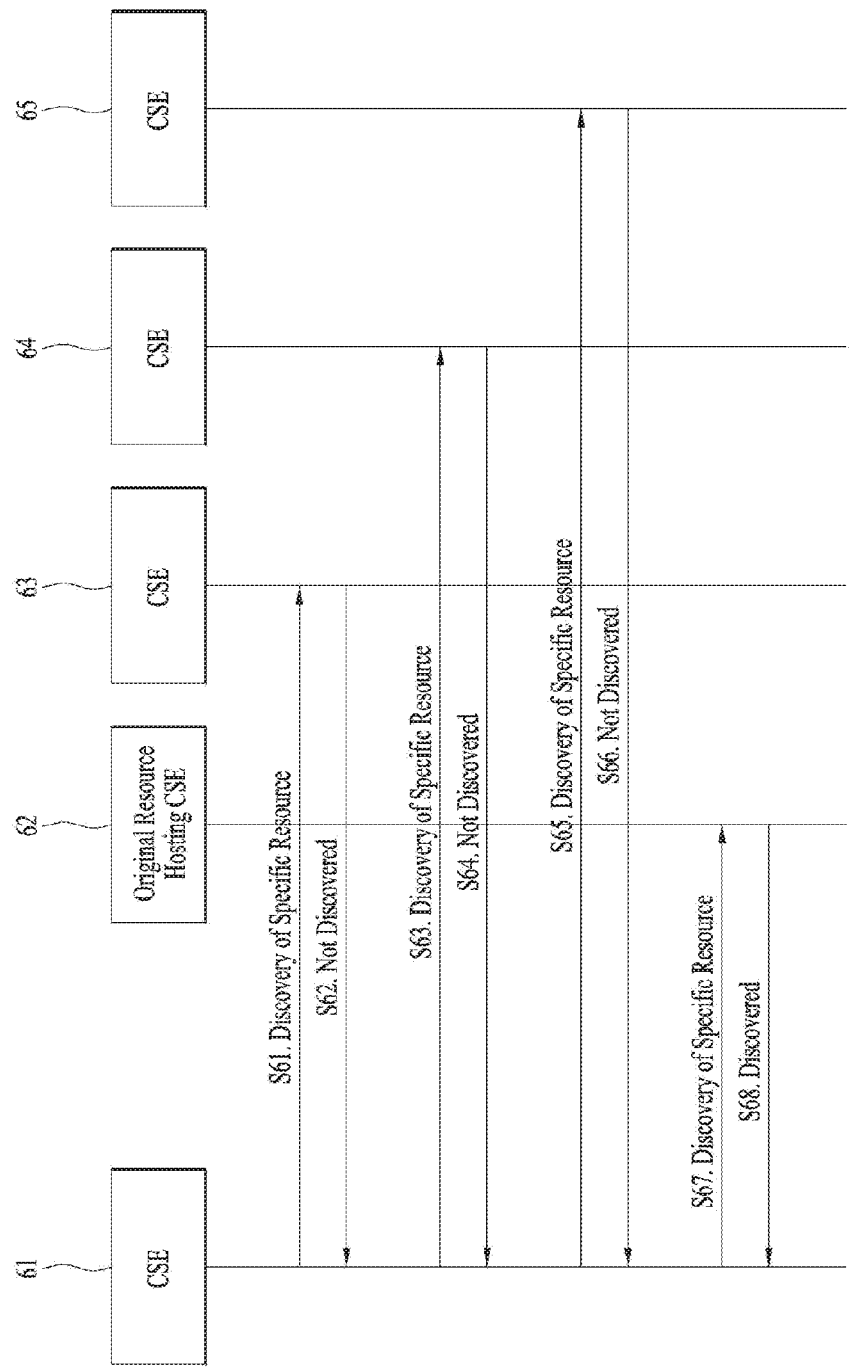
FIG. 6 is a diagram illustrating a signal flow for a resource discovery procedure.

FIG. 6 is a diagram illustrating a signal flow for a resource discovery procedure. A CSE 61 transmits a discovery request to CSEs 63, 64, and 65 to discover a specific resource in steps S61, S63, S65, and S67, and repeats the resource discovery until step S68. The reason for the CSE 61 to have no prior knowledge of the location (uniform resource identifier (URI) information) of an intended resource is that M2M devices are distributed randomly across a wide area, or the resource may be created later by a specific trigger, not in an initial stage. In the former case, since the CSE 61 does not know what M2M devices exist at what locations, each M2M device may have different information. In the latter case, the CSE 61 should periodically transmit a discovery request because it does not know when a specific resource will be created.

Now, a description will be given of a conventional resource announcement scheme. Resource announcement refers to notifying or informing one or more other CSEs of the existence of a specific resource. In brief, resource announcement is a process of creating a resource (i.e., an original resource) that a specific CSE has in the form of an announced resource at another CSE. The announced resource provides only limited information about the original resource, such as the URI address and labels attribute of the original resource.

A resource existing at a specific CSE may be announced to a remote CSE to inform the remote CSE of the existence of the specific resource. Resource announcement or resource announce facilitates resource discovery because an original resource hosting CSE having a specific resource (original resource) may inform a remote CSE interested in the specific resource of the existence of the specific resource, thereby obviating the need for the remote CSE to perform resource discovery with a wide range of CSEs. Basically, an announce resource has only limited information about the original resource, such as the URI information (link attribute) and the labels attribute of the original resource.

Figure 7:
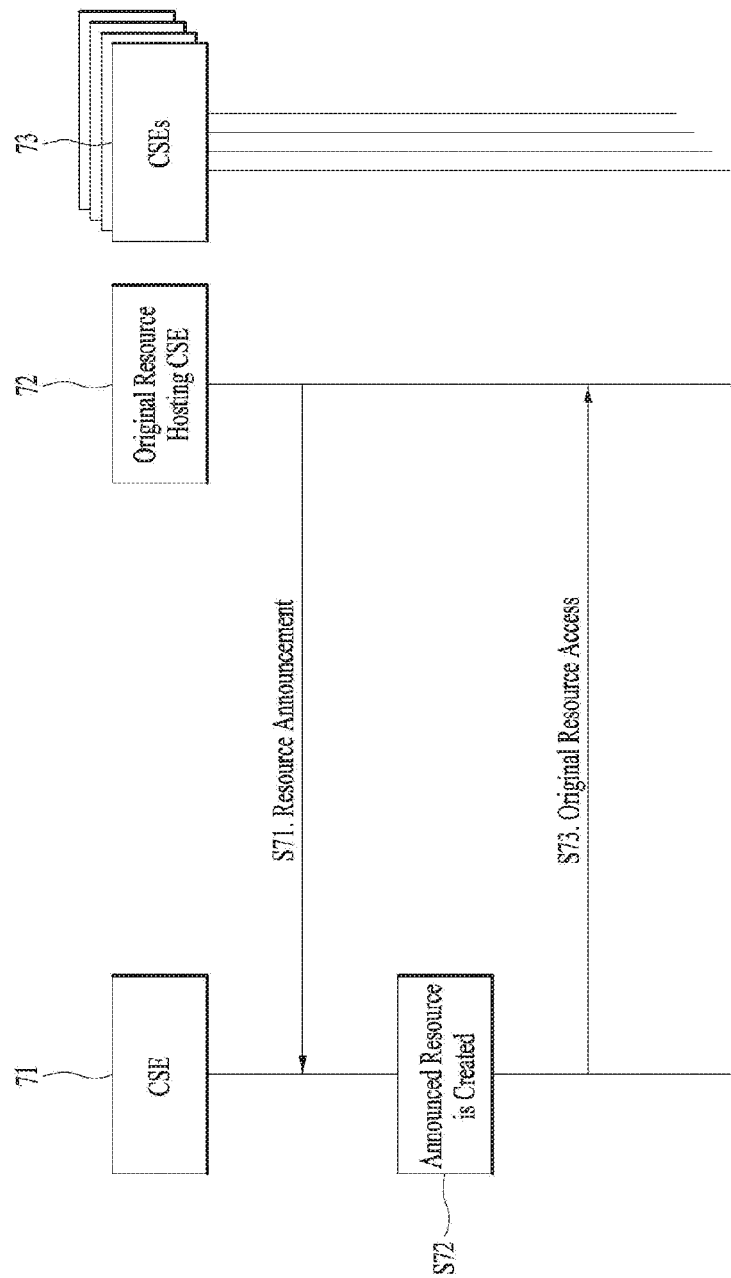
FIG. 7 is a diagram illustrating a signal flow for a resource announcement procedure.

FIG. 7 illustrates a resource announcement procedure. A CSE 72 having a specific resource (an original resource) informs a remote CSE 71 of the existence of the original resource by resource announcement (S71). Along with resource announcement to the remote CSE 71, an announced resource is created at the remote CSE 71 (S72). Because the announced resource basically provides link information about the original resource, the remote CSE 71 may easily locate the original resource having specific information and access the original resource (S73), to thereby use a service provided by the original resource.

If an original resource is deleted after it is announced to a remote CSE, all announced resources for the original resource should also be deleted. If an announced resource remains undeleted, the announced resource causes a problem because it provides information about the absent original resource. If an announced resource is not deleted promptly upon deletion of the original resource (e.g., the CSE 71 having the announced resource is not reachable), the announced resource may be deleted later either by the CSE 72 having the original resource or by expiration of the announced resource itself according to an 'expirationTime' attribute assigned to the announced resource. For this purpose, in the case where the original resource is announced, the original resource has a list of the URI addresses of announced resources (an announceTo attribute).

An announced resource created by resource announcement has the URI address of an original resource residing on another CSE. Although the announced resource is a real resource (not a virtual resource) having a separate resource type, the announced resource characteristically has a link attribute that stores a URI indicating the original resource and has a limited set of available attributes. For example, while a <container> resource has an <instant> resource as a child resource to store data and the <instant> resource has a content attribute, an announced resource <containerAnnc> for the <container> resource simply provides URI information about the original resource in a link attribute, without directly storing data (without requiring the <instant> resource and the content attribute of the <instant> resource). If other information about the original resource is to be further required, it is necessary to directly access the original resource through the URI of the original resource provided by the announced resource. Resource announcement for the original resource is performed only by an original resource hosting CSE having the original resource.

Figure 8:
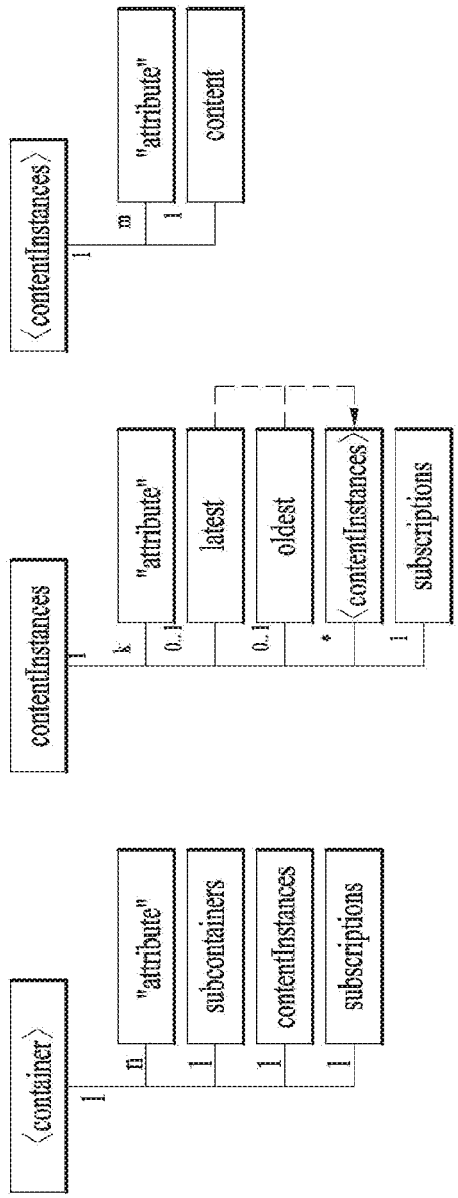
FIGS. 8 and 9 illustrate a <container> resource and a <containerAnnc> resource, respectively.
Figure 9:
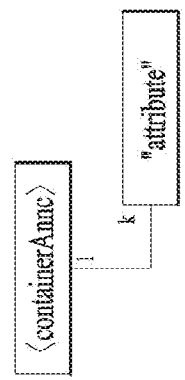

FIGS. 8 and 9 illustrate the <container> resource and the <containerAnnc> resource.

Figure 10:
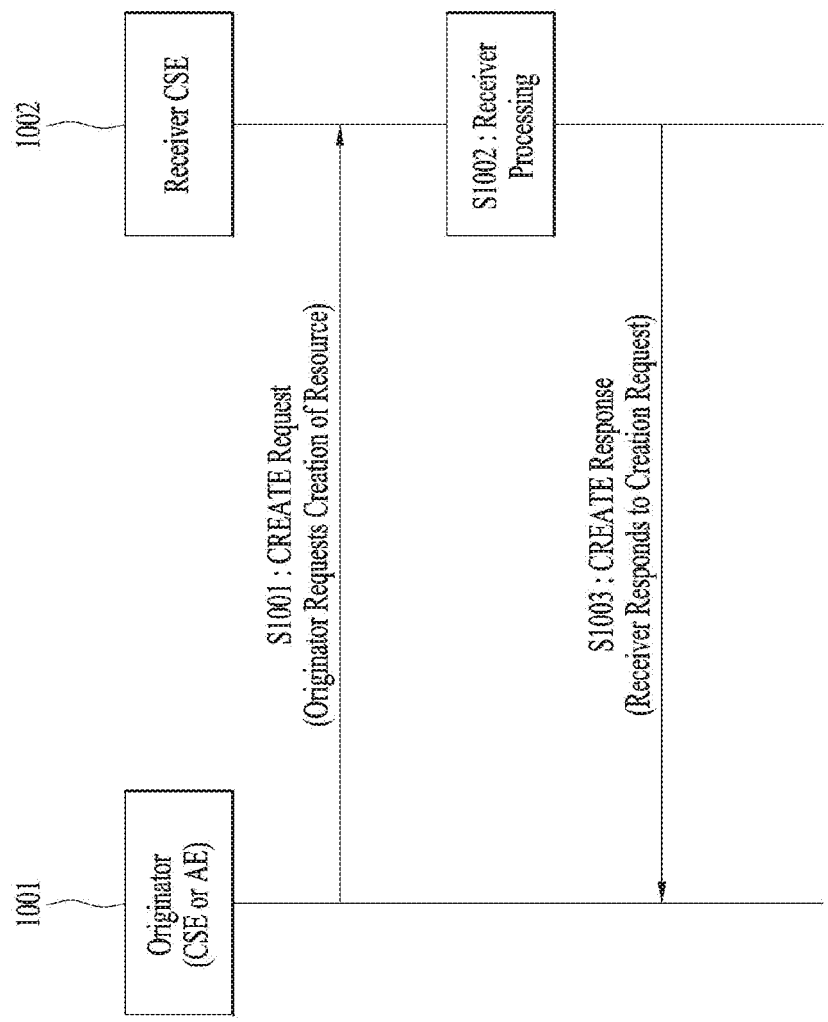
FIG. 10 is a diagram illustrating a signal flow for a creation procedure in the M2M communication system.

FIG. 10 illustrates a creation procedure in an M2M communication system.

The creation procedure is used by an originator, a CSE, or an AE, for creating a resource on a receiver CSE. The creation procedure is largely divided into a registration-related creation procedure and a non-registration-related creation procedure. FIG. 10 illustrates the non-registration-related creation procedure, and the registration-related creation procedure will not be described in the present disclosure.

The non-registration-related creation procedure is applicable to all resource types which are not related to registration (e.g., resources except <remoteCSE> and <AE>). An originator 1001 may request creation of a resource by a CREATE request (S1001). The CREATE request message may include a corresponding operator type (i.e., Create), the location of a resource to be created, that is, the URI of the resource, an identifier (ID) of the originator, the type of the resource to be created, the name of the resource to be created, which is provided by the originator, attributes of the resource to be created, which will be provided by the originator, and the like.

A receiver CSE 1002 may authenticate the request by, for example, checking whether the originator has appropriate authority to transmit the request (S1002). If the authentication is successful, the receiver CSE may create the resource.

Subsequently, the receiver CSE may transmit, to the originator, a response including the ID of the originator, an ID of the receiver CSE or a URI of the created resource, and optionally, the content of the created resource, that is, attributes (S1003). On the contrary, if the authentication is failed in step S1002, the receiver CSE may transmit a response indicating error to the originator.

Figure 11:
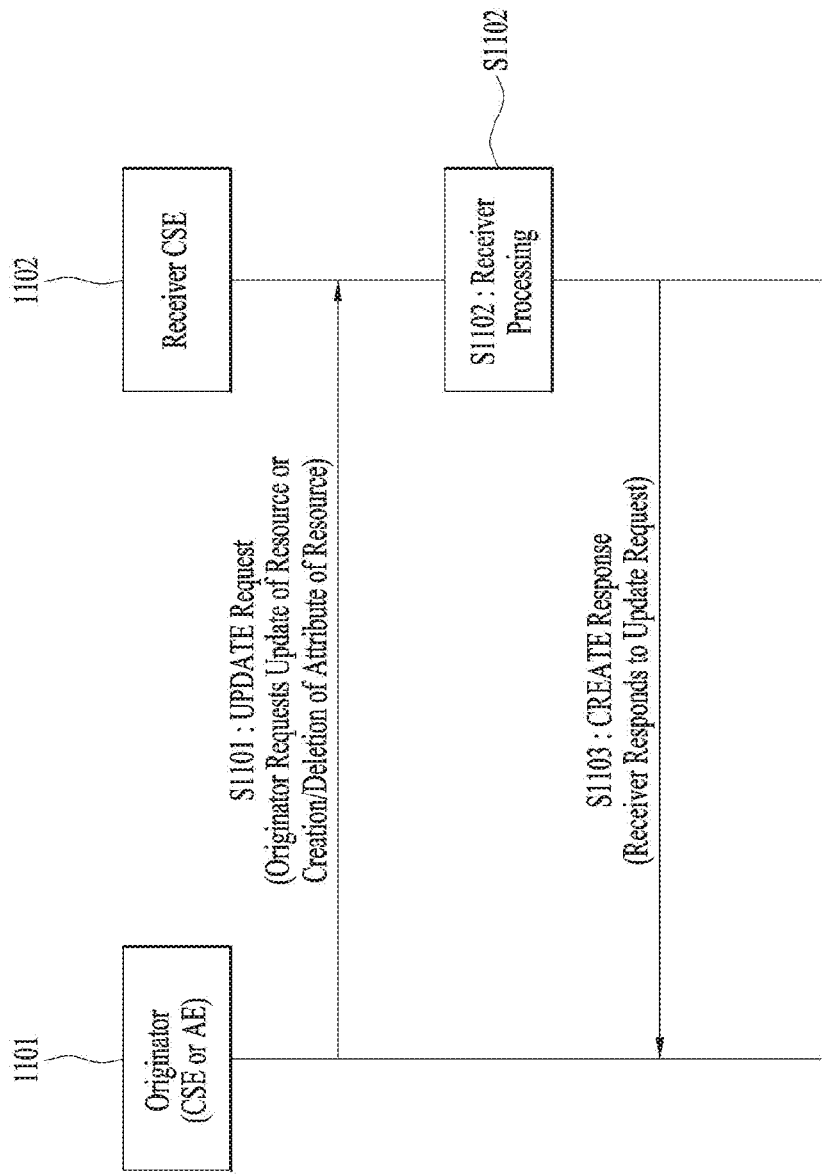
FIG. 11 is a diagram illustrating a signal flow for an update procedure in the M2M communication system.

FIG. 11 illustrates an update procedure in the M2M communication system.

The update procedure is used to update information stored in attributes of a target resource. Particularly, expirationTime is importable because a CSE having the resource may delete the resource after a time indicated by the expirationTime attribute. To prevent this, an expiration time needs to be updated periodically. An originator CSE or AE may update, create, or delete a specific attribute(s) in the target resource by including the name(s) and value(s) of the specific attribute(s) in an update request message.

An originator 1101 may transmit an update request message to a receiver CSE 1102 (S1101). The update request message may include a corresponding operator type (i.e., Update), the location of a target resource, that is, a URI of the target resource, an ID of the originator, and information about an attribute(s) to be updated, created, or deleted in the target resource. The information about the attribute(s) may include the name(s) of the attribute(s) or associated updated or assigned values.

The receiver CSE may authenticate whether the originator has authority to modify the target resource (S1102). If the authentication is successful, the receiver CSE may update the resource as requested.

The type of a resource to be created, the name of the resource to be created, which is provided by the originator, attributes of the resource to be created, which will be provided by the originator, and the like may be included.

Then, the receiver CSE may transmit, to the originator, a response message including the ID of the originator, an ID of the receiver CSE, and modified content or an operation result (S1103). On the contrary, if the authentication is failed in step S1102, the receiver CSE may transmit a response indicating error to the originator.

An AE or CSE may perform resource announcement using an 'announceTo' attribute included in an original resource. The 'announceTo' attribute of the original resource is a list of the URIs of resources announced successfully by the original resource. A CSE hosting the original resource (hereinafter, referred to shortly as "original resource hosting CSE") performs resource announcement on behalf of an originator. The originator may add a new CSE-ID to the 'announceTo' attribute by transmitting an update request message for the 'announceTo' attribute to the original resource hosting CSE. In this case, the original resource hosting CSE first performs resource announcement to a CSE indicated by the CSE-ID. If the resource announcement is successful, the original resource hosting CSE adds the URI address of the announced resource to the 'announceTo' attribute. Also, 'announceTo' attribute information may be included in a response to the originator's update command. In this case, the 'announceTo' attribute information indicates a list of CSEs to which the resource announcement is successful. Accordingly, the originator may determine whether the original resources has been successfully announced to a specific CSE. On the contrary, the originator may delete an announced resource indicated by a specific URI address by transmitting an attribute update command and thus updating the 'announceTo' attribute so that the specific URI address may be deleted in the 'announceTo' attribute.

Figure 12:
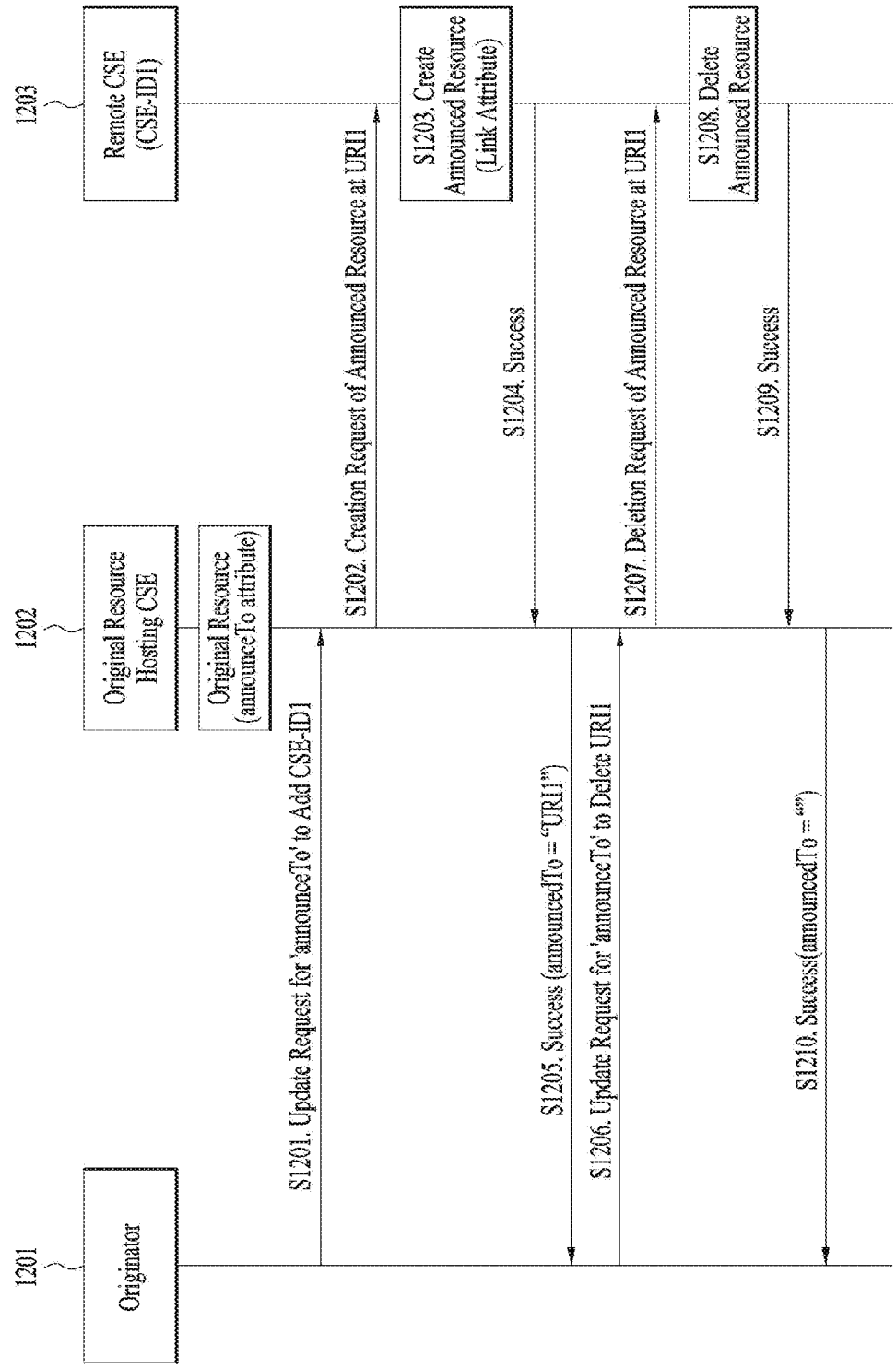
FIG. 12 is a diagram illustrating a signal flow for a resource announcement procedure and a resource de-announcement procedure.

FIG. 12 illustrates a procedure for announcing an original resource to a remote CSE 1203 using an 'announceTo' attribute in the original resource, and deleting an announced resource by an originator (AE or CSE) 1201.

S1201: The originator 1201 transmits a request to announce the original resource to the remote CSE 1203 indicated by CSE-ID1. A receiver of the request is an original resource hosting CSE 1202 having the original resource. The request requests addition of CSE-ID1 to the 'announceTo' attribute in the original resource.

S1202: The original resource hosting CSE 1202 which has received the request transmits a request for creating an announced resource to the remote CSE 1203 indicated by CSE-ID1. The original resource hosting CSE 1202 may determine an accurate location (URI1, herein) at which the announced resource is to be created. Attribute information that the announced resource should have includes the same link information and labels information as the original resource, irrespective of the type of the original resource.

S1203: Upon receipt of the request for creating an announced resource, the remote CSE 1203 creates the announced resource. The announced resource has the same information irrespective of its type (e.g., <containerAnnc>, <accessRightAnnc>, or the like) and should always have a link attribute and a labels attribute. The link attribute stores the URI of the original resource.

S1204: The remote CSE 1203 transmits a response indicating successful creation of the announced resource. Upon receipt of the response, the original resource hosting CSE 1202 adds the URI (URI1, herein) of the announced resource to the 'announceTo' attribute of the original resource.

S1205: The original resource hosting CSE 1202 transmits a response to the request received in step S1201 to the originator 1201. The response includes 'announceTo' attribute information about the original resource and, in this example, the 'announceTo' attribute information includes URI1. Upon receipt of the response, the originator 1201 is aware that the original resource has been successfully announced to CSE-ID1 (URI1 may include CSE-ID1 information).

S1206: This is an example of deleting an announced resource by the originator 1201. The originator 1201 transmits a request for deleting the announced resource at URI1 to the original resource hosting CSE 1202. The request is an update request for deleting URI1 in the 'announceTo' attribute of the original resource.

S1207: Upon receipt of the request in step S1206, the original resource hosting CSE 1202 transmits a request for deleting the announced resource to the remote CSE 1203 indicated by URI1.

S1208: Upon receipt of the request in step S1207, the remote CSE 1203 deletes the announced resource indicated by URI1.

S1209: The remote CSE 1203 indicates successful deletion of the announced resource indicated by URI1 by a response. Upon receipt of the response, the original resource hosting CSE 1202 deletes URI1 in the 'announceTo' attribute of the original resource.

S1210: the original resource hosting CSE 1202 transmits a response to the request received in step S1206. The response includes 'announceTo' attribute information about the original resource. In this example, URI1 is deleted and thus attribute information corresponding to URI1 is empty in the 'announceTo' attribute information. Upon receipt of the response, the originator is aware that the announced resource corresponding to URI1 has been successfully deleted.

However, the purpose of an announced resource lies in effective search for an original resource. Since the announced resource has only 'link' and 'labels' information, information about the original resource is insufficient.

Therefore, only the limited information of the announced resource is used in searching for the original resource, which causes a problem. For example, if a sensor device at a specific location is to be detected, location information is stored in a <content> attribute of a <container> resource, and an announced resource does not have information about the 'content' attribute. As a result, the sensor device may not be detected. To detect the sensor device, all attributes of an original resource may be provided to the announced resource. In this case, however, as the original resource is copied, it is inefficient and even unnecessary information may exist in the announced resource.

Accordingly, the present disclosure is intended to provide a method for announcing a resource and de-announcing the resource by an AE or CSE in an M2M environment in order to solve the above-described problem.

The present invention proposes attribute announcement or attribute announce in addition to the conventional resource announcement scheme.

Among the attributes of a specific resource, there are mandatory attributes and optional attributes. A mandatory attribute should be supported by the resource and always exist in the resource. On the other hand, an optional attribute may not be supported, and only when supported, it is present in the resource. A resource should have all mandatory attributes all the time and may have optional attributes selectively. For example, a <container> resource has the following attributes. Among the attributes, attributes with Multiplicity set to a non-zero value are mandatory. If Multiplicity is zero for an attribute, the attribute is optional.

TABLE 1

| Attribute Name of <container> | Multiplicity | RW/RO/WO | Description |
|---|---|---|---|
| resourceType | 1 | RO | Resource Type. This Write Once (at creation time then cannot be changed) resourceType attribute identifies the type of resources. Each resource shall have a resourceType attribute. |
| resourceID | 1 | WO | This attribute is an identifier for resource that is used for 'non-hierarchical URI method' or 'IDs based method' cases. This attribute shall be provided by the Hosting CSE when it accepts a resource creation procedure. The Hosting CSE shall assign a resourceID which is unique in the CSE. |
| parentID | 1 | RO | The system shall assign the value to this attribute according to the parameters given in the CREATE Request. It establishes the parent-child relationship by identification of the parent of this child resource. Such identifier shall use the non-hierarchical URI representation. For example, an AE resource with the identifier "myAE1" which has been created under the resource ". . . //example.com/oneM2M/myCSE", the value of the parent ID attribute will contain ". . . //parent ID" |
| expirationTime | 1 | RW | Time/date after which the resource will be deleted by the hosting CSE. This attribute can be provided by the Originator, and in such a case it will be regarded as a hint to the hosting CSE on the lifetime of the resource. The hosting CSE can however decide on the real expirationTime. If the hosting CSE decides to change the expirationTime attribute value, this is communicated back to the Originator. The lifetime of the resource can be extended by providing a new value for this attribute in an UPDATE operation. Or by deleting the attribute value, e.g. by not providing the attribute when doing a full UPDATE, in which case the hosting CSE can decide on a new value. |

TABLE 1-continued

| Attribute Name of <container> | Multi-plicity | RW/ RO/ WO | Description |
|---|---|---|---|
| accessControlPolicyIDs | 0 . . . 1 (L) | RW | This attribute shall be mandatory. If the Originator does not provide a value in the CREATE operation the system shall assign an appropriate value depending on its local policies and/or M2M service subscription agreements. The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). If a resource type does not have an accessControlPolicyIDs attribute definition, then the accessControlPolicy for that resource is governed in a different way, for example, the accessControlPolicy associated with the parent may apply to a child resource that does not have an accessControlPolicyIDs attribute definition, or the privileges for access are fixed by the system. Refer to the corresponding resourceType and procedures to see how permissions are handled in such cases. If a resource type does have an accessControlPolicyIDs attribute definition, but the (optional) accessControlPolicyIDs attribute is not set, or it is set to a value that does not correspond to a valid, existing <accessControlPolicy> resource, or it refers to an <accessControlPolicy> resource that is not reachable (e.g. because it is located on a remote CSE that is offline or not reachable), then the system default access permissions shall apply. All resources are accessible only if the privileges from the Access Control Policy grants it, therefore all resources shall have an associated AccessControlPolicyIDs attribute, either explicitly (setting the attribute in the resource itself) or implicitly (either by using the parent privileges or the system defaults). Which means that the system shall provide a default access privileges in case that the Originator does not provide a specific AccessControlPolicyIDs during the creation of the resource, Default access grants the configures privileges to the originator (e.g. depending on the prefix of URI of the resource). |

TABLE 1-continued

| Attribute Name of <container> | Multi-plicity | RW/RO/WO | Description |
|---|---|---|---|
| | | | This attribute is absent from the resource in some cases, especially if the resource shall have the same privileges of the parent resource; such an attribute is therefore not needed. To update this attribute, a Hosting CSE shall check whether an Originator has Update permission in any selfPrivileges of the <accessControlPolicy> resources which this attribute originally indicates. |
| labels | 0 . . . 1 | RO | Tokens used as keys for discovering resources. This attribute is optional and if not present it means that the resource cannot be found by means of discovery procedure which uses labels as key parameter of the discovery. |
| creationTime | 1 | RW | Time/date of creation of the resource. This attribute is mandatory for all resources and the value is assigned by the system at the time when the resource is locally created. Such an attribute cannot be changed. |
| creator | 1 | RW | The AE-ID or CSE-ID of the entity which created the resource. |
| lastModifiedTime | 1 | RO | Last modification time/date of the resource. This attribute shall be mandatory and its value is assigned automatically by the system each time that the addressed target resource is modified by means of the UPDATE operation. |
| stateTag | 1 | RO | An incremental counter of modification on the resource. When a resource is created, this counter is set to 0, and it will be incremented on every modification of the resource. NOTE: In order to enable detection of overflow, the counter needs to be capable of expressing sufficiently long numbers.. NOTE: This attribute has the scope to allow identifying changes in resources within a time interval that is lower than the one supported by the attribute lastModifiedTime (e.g. less than a second or millisecond). This attribute can also be used to avoid race conditions in case of competing modifications. Modifications (e.g. update/delete) can be made on the condition that this attribute has a given value. |
| maxNrOfInstances | 0 . . . 1 | RW | Maximum number of instances of <instance> child resources. |
| maxByteSize | 0 . . . 1 | RW | Maximum number of bytes that are allocated for a <container> resource for all instances in the <container> resource. |
| maxInstanceAge | 0 . . . 1 | RW | Maximum age of the instances of <instance> resources within the <container>. The value is expressed in seconds. |

TABLE 1-continued

| Attribute Name of <container> | Multi-plicity | RW/ RO/ WO | Description |
| --- | --- | --- | --- |
| currentNrOfInstances | 1 | RO | Current number of instances in a <container> resource. It is limited by the maxNrOfInstances. |
| currentByteSize | 1 | RO | Current size in bytes of data stored in a <container> resource. It is limited by the maxNrOfBytes. |
| latest | 0 . . . 1 | RO | Reference to latest instance, when present. |
| locationID | 0 . . . 1 | RW | URI of the resource where the attributes/policies that define how location information are obtained and managed. This attribute is defined only when the <container> resource is used for containing location information. |
| ontologyRef | 0 . . . 1 | RW | A reference (URI) of the ontology used to represent the information that is stored in the instances of the container. NOTE: the access to this URI is out of scope of oneM2M |
| announceTo | 1 | RW | This attribute may be included in a CREATE or UPDATE Request in which case it contains a list of URIs/CSE-IDs which the resource being created/updated shall be announced to. This attribute shall only be present on the original resource if it has been successfully announced to other CSEs. This attribute maintains the list of URIs to the successfully announced resources. Updates on this attribute will trigger new resource announcement or de-announcement. |

An announced resource basically has a link attribute and stores the URI of an original resource in the link attribute. Even though an attribute of the original resource is mandatory, the announced resource may not have the attribute. Also, according to the foregoing conventional technology, the announced resource always has predetermined attributes. For example, an announced resource type <containerAnnc> of the <container> resource has the following attributes.

TABLE 2

| Attribute Name of <containerAnnc> | Multi-plicity | RW/ RO/ WO | Description |
| --- | --- | --- | --- |
| resourceType | 1 | RO | Refer to Table 1 |
| parentID | 1 | RO | Refer to Table 1 |
| expirationTime | 1 | RW | Refer to Table 1 |
| Link | 1 | WO | This attribute shall be present only on the announced resource. This attribute shall provide the link (URI) to the original resource. |
| accessRightID | 1 | RW | Refer to Table 1 |
| labels | 1 | RW | Refer to Table 1 |

Therefore, to obtain information such as a 'currentNrOfInstances' attribute and an 'ontologyRef' attribute present in the original resource, the original resource should be directly accessed because <containerAnnc> does not have these attributes.

If the announced resource is capable of directly providing information about attributes of the original resource, it is more efficient because there is no need for directly accessing the original resource. For example, if the <containerAnnc> resource has an 'ontologyRef' attribute and the ontologyRef attribute has the same value as the 'ontologyRef' attribute of the original resource, information may be acquired directly from the 'ontologyRef' attribute of the announced resource without accessing the original resource. In this manner, an attribute of the original resource may be announced to the announced resource. This is called attribute announcement.

However, if all attributes of the original resource are announced to the announced resource, the resulting announcement of unnecessary attributes may cause overhead. Accordingly, only necessary attributes should be announced. Different attributes may require attribute announcement under circumstances despite the same resource type. Therefore, the present invention also provides a method for classifying the attributes of an original resource into the following three types.

MA (Mandatory Announced): The attribute in the original resource is announced to the announced resource. The content of such an announced attribute is the same as the original attribute.

OA (Optional Announced): The attribute in the original resource may be announced to the announced resource depending on the contents of an 'announcedAttribute' attribute in the original resource. The contents of such an announced attribute is the same as the contents of the original attribute.

NA (Not Announced): The original attribute is not announced to the announced resource.

An attribute marked with OA may be announced selectively using an 'announcedAttribute' attribute. The 'announcedAttribute' attribute will be described below. The 'announcedAttribute' attribute is always present in an announce-able original resource.

'announcedAttribute' attribute: If some OA attributes are announced to other CSEs, this attribute is present in the original resource. The 'announcedAttribute' attribute includes a list of announced OA attributes in the original resource. Update of the 'announcedAttribute' attribute may trigger new attribute announcement in the case of adding a new attribute or attribute de-announcement in the case of deleting an existing attribute.

For example, each attribute of the <container> resource may be marked with MA/OA/NA as follows. As mentioned before, an attribute marked with MA is necessarily announced to an announced resource and thus present in the announced resource. An attribute marked with NA should not be present in the announced resource. An attribute marked with OA may be present in the announced resource depending on the 'announcedAttribute' attribute.

[Table 1] may be given as follows according to the type (MA, OA, or NA) of the original resource.

TABLE 3

| Attribute Name of <containerAnnc> | Multi-plicity | RW/RO/WO | Description |
|---|---|---|---|
| resourceType | 1 | RO | Same as Table 1 |
| resourceID | 1 | WO | Same as Table 1 |
| parentID | 1 | RO | Same as Table 1 |
| expirationTime | 1 | RW | Same as Table 1 |
| accessControlPolicyIDs | 0 . . . 1 (L) | RW | Same as Table 1 |
| labels | 0 . . . 1 | RO | Same as Table 1 |
| creationTime | 1 | RW | Same as Table 1 |
| creator | 1 | RW | Same as Table 1 |
| lastModifiedTime | 1 | RO | Same as Table 1 |
| stateTag | 1 | RO | Same as Table 1 |
| announceTo | 1 | RW | Same as Table 1 |
| announcedAttribute | 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| maxNrOfInstances | 0 . . . 1 | RW | Same as Table 1 |
| maxByteSize | 0 . . . 1 | RW | Same as Table 1 |
| maxInstanceAge | 0 . . . 1 | RW | Same as Table 1 |
| currentNrOfInstances | 1 | RO | Same as Table 1 |
| currentByteSize | 1 | RO | Same as Table 1 |
| latest | 0 . . . 1 | RO | Same as Table 1 |
| locationID | 0 . . . 1 | RW | Same as Table 1 |
| ontologyRef | 0 . . . 1 | RW | Same as Table 1 |
| announceTo | 1 | RW | Same as Table 1 |

Figure 13:
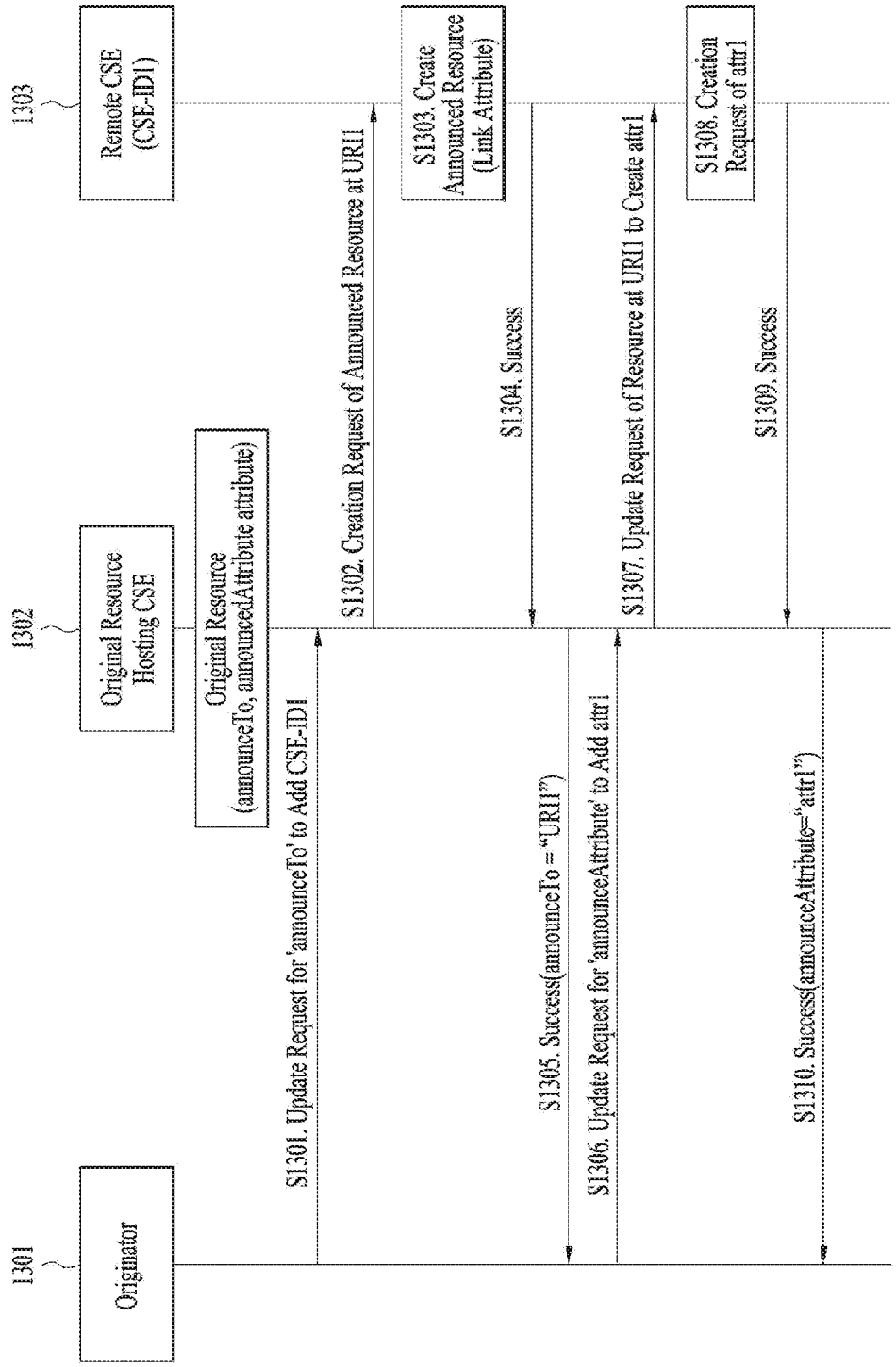
FIG. 13 is a diagram illustrating a signal flow for an attribute announcement procedure according to an embodiment of the present invention.

FIG. 13 is a diagram illustrating a signal flow for an attribute announcement procedure according to an embodiment of the present invention.

S1301: An originator 1301 may transmit, to an original resource hosting CSE 1302, a request for announcing an original resource to a remote CSE 1303. The request requests addition of a CSE-ID or a URI to an 'announceTo' attribute present in the original resource. If the originator 1301 has accurate URI information to create an announced resource, a URI is added. If the originator 1301 is aware of only a CSE-ID to create an announced resource, the CSE-ID is added. In the embodiment, it is assumed that CSE-ID1 is added.

S1302: Upon receipt of the request from the originator 1301, the original resource hosting CSE 1302 may transmit a request for creating an announced resource to the remote CSE 1303 indicated by CSE-ID1. If the original resource hosting CSE 1302 has received a CSE-ID in the request in step S1301, the original resource hosting CSE 1302 may determine an accurate location (URI1, herein) at which the announced resource is to be created. Obviously, if the original resource hosting CSE 1303 receives URI information in the request in step S1301, the original resource hosting CSE 1302 does not need to determine URI1.

The announced resource necessarily has MA attributes of the original resources, does not have NA attributes of the original resource, and may have OA attributes of the original resource, if the OA attributes are indicated in an 'announcedAttribute' attribute. Therefore, the resource creation request in this step includes the MA attributes and only the attributes indicated in the 'announcedAttribute' attribute from among OA attributes, and the MA and OA attributes should have the same values as their original attributes of the original resource.

S1303: Upon receipt of the request for creating an announced resource, the remote CSE 1303 may create an announced resource. The remote CSE 1303 may validate the request before processing the request. For example, the remote CSE 1303 may determine whether the announced resource includes all MA attributes of the original resource and does not include any NA attribute of the original resource.

S1304: If the announced resource has been successfully created, the remote CSE 1303 may transmit a response indicating successful creation of the announced resource to the original resource hosting CSE 1302. Upon receipt of the response, the original resource hosting CSE 1302 may add the URI (URI1, herein) of the successfully created announced resource to the 'announceTo' attribute of the original resource.

S1305: The original resource hosting CSE 1302 transmits a response to the request received in step S1301 to the originator 1301. The response includes 'announceTo' attribute information of the original resource, URI1 in this example. Upon receipt of the response, the original 1301 is aware that the original resource has been successfully announced to CSE-ID1 (URI1 may include CSE-ID1 information). If not the CSE-ID but the URI has been given in step S1301, the originator 1301 just checks whether the URI is included in the 'announceTo' attribute.

S1306: The originator 1301 may request attribute announcement of a specific attribute to the original resource hosting CSE 1302. Attribute announcement is available only for OA attributes of the original resource. The originator 1301 may transmit, to the original resource hosting CSE 1302, an update request for adding the name of the attribute requested for attribute announcement to the 'announcedAttribute' attribute of the original resource.

S1307: Upon receipt of the update request in step S1306, the original resource hosting CSE 1302 may transmit an update command requesting creation of an announced attribute for all announced resources of the original resource. Attribute creation amounts to updating an announced resource so that the announced resource may have the attribute. Therefore, the announced attribute may be created by transmitting the update command for the announced resource. Owing to the presence of a list of the URIs of announced resources in the 'announceTo' attribute of the original resource, a request for creating an announced attribute may be transmitted for all of these announced resources. The original resource hosting CSE 1302 determines whether the attribute requested for attribute announcement is an OA attribute before transmitting the above request. When requesting creation of an announced attribute, the original resource hosting CSE 1302 should transmit a creation request including the same value as the original attribute of the original resource.

S1308: Upon receipt of the request in step S1307, the remote CSE 1303 may create an announced attribute. The remote CSE 1303 may create the announced attribute only when the attribute is an OA attribute.

S1309: If the announced attribute has been successfully created, the remote CSE 1303 may transmit a response indicating successful creation of the announced attribute. Upon receipt of the response, the original resource hosting CSE 1302 adds the name of the successfully created announced resource to the 'announcedAttribute' attribute of the original resource. The attribute added to the 'announcedAttribute' attribute may additionally include information indicating whether the attribute announcement has been successful for all of the announced resources or only a part of the announced resources.

S1310: The original resource hosting CSE 1302 transmits a response to the request received in step S1306. The response includes 'announcedAttribute' attribute information of the original resource, attr1 in this example. Upon receipt of the response, the original 1301 is aware that the original attribute attr1 has been successfully announced.

Figure 14:
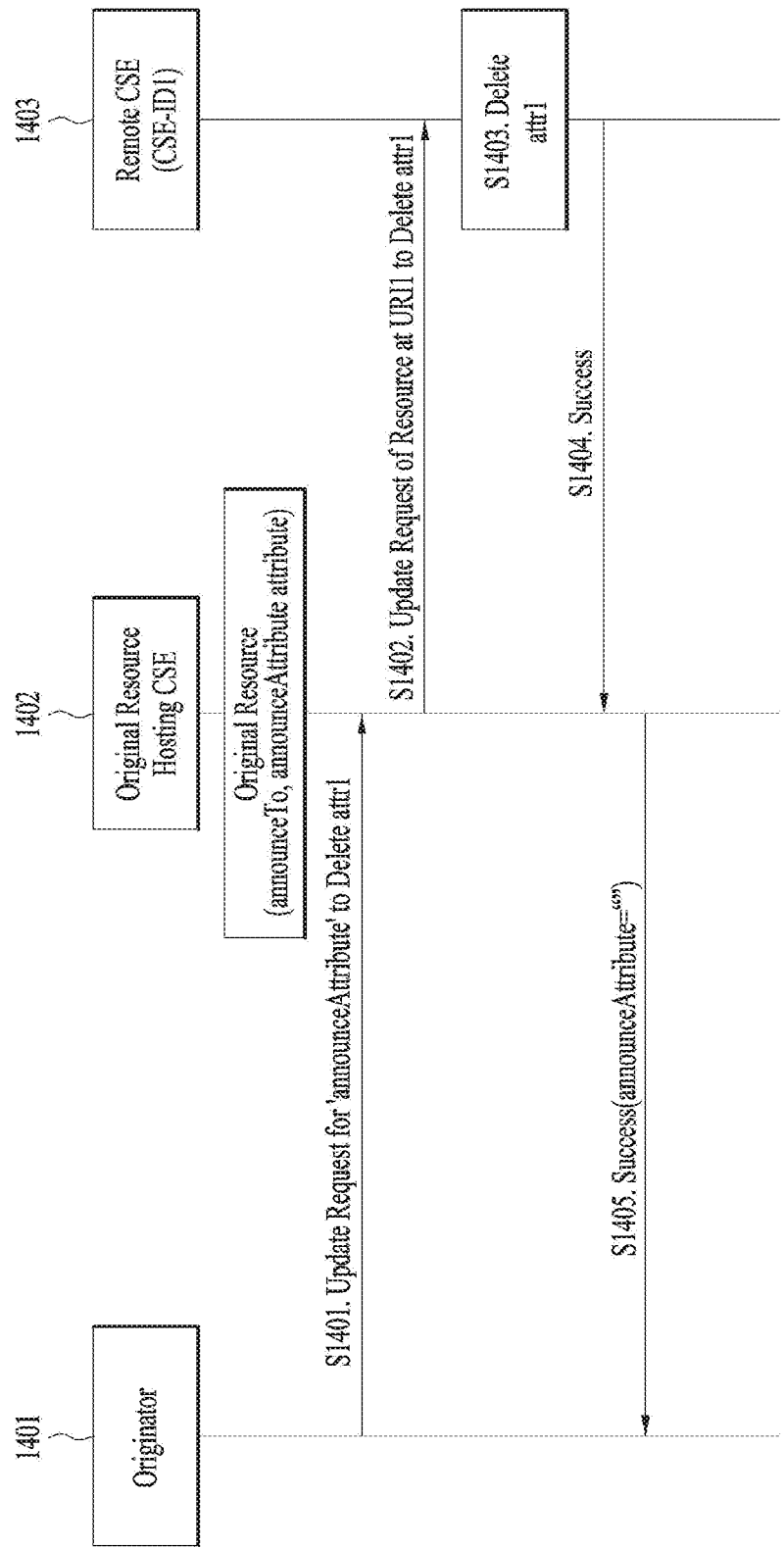
FIG. 14 is a diagram illustrating a signal flow for an attribute de-announcement procedure according to an embodiment of the present invention.

FIG. 14 is a diagram illustrating a signal flow for an attribute de-announcement procedure according to an embodiment of the present invention.

S1401: An originator 1401 may transmit, to an original resource hosting CSE 1402, a request for de-announcing a specific attribute for which attribute announcement has been performed. If the attribute de-announcement is successfully performed, the specific attribute is deleted from an announced resource. The originator 1401 may transmit an update command for deleting the name of the specific attribute from the 'announcedAttribute' attribute of the original resource to the original resource hosting CSE 1402. Only OA attributes of the original resource may be subjected to attribute de-announcement.

S1402: Upon receipt of the request for deleting the announced attribute in step S1401, the original resource hosting CSE 1402 may transmit an update command requesting deletion of the announced attribute for all announced resources of the original resource. Since there is a list of the URIs of announced resources in the 'announceTo' attribute of the original resource, the request for deleting the announced attribute is transmitted for all announced resources. The original resource hosting CSE 1402 determines whether the specific attribute requested for attribute de-announcement is marked with OA, before transmitting the request.

S1403: Upon receipt of the request for attribute de-announcement in step S1402, the remote CSE 1403 may delete the attribute. The remote CSE 1403 may delete the attribute, after determining whether the attribute to be de-announced is marked with OA.

S1404: The remote CSE 1403 may transmit a response indicating successful deletion of the announced attribute. Upon receipt of the response, the original resource hosting CSE 1402 may delete the name of the successfully deleted attribute from the 'announcedAttribute' attribute of the original resource.

S1405: The original resource hosting CSE 1402 transmits a response to the request received in step S1401. The response includes 'announcedAttribute' attribute information of the original resource, and attr1 is deleted in the 'announcedAttribute' attribute information in this example. Upon receipt of the response, the originator 1401 is aware that the attribute corresponding to attr1 has been successfully de-announced.

The above procedure may also be performed as follows.

S1401: The originator 1401 may transmit, to the original resource hosting CSE 1402, a request for de-announcing a specific attribute for which attribute announcement has been performed. If the attribute de-announcement is performed, the specific attribute is deleted from an announced resource. The originator 1401 may transmit an update command for deleting the name of the specific attribute from the 'announcedAttribute' attribute of the original resource to the original resource hosting CSE 1402. Only OA attributes of the original resource may be subjected to attribute de-announcement.

S1402: Upon receipt of the request for deleting the announced attribute in step S1401, the original resource hosting CSE 1402 may transmit a request for deleting the announced attribute for all announced resources of the original resource. Since there is a list of the URIs of announced resources in the 'announceTo' attribute of the original resource, the request for deleting the announced attribute is transmitted for all announced resources. The original resource hosting CSE 1402 determines whether the specific requested for attribute de-announcement is marked with OA, before transmitting the request. The original resource hosting CSE 1402 transmits the request for deleting the announced attribute for all announced resources, and deletes the name of the attribute from the 'announcedAttribute' attribute irrespective whether the request has been successfully processed.

S1403: Upon receipt of the request for attribute de-announcement in step S1402, the remote CSE 1403 may delete the attribute. Only if the attribute requested for attribute de-announcement is marked with OA, the remote CSE 1403 may delete the attribute.

S1404: The remote CSE 1403 may transmit a response indicating successful deletion of the announced attribute to the original resource hosting CSE 1402.

S1405: The original resource hosting CSE 1402 may transmit a response to the request received in step S1401. The response includes 'announcedAttribute' attribute information of the original resource, and attr1 is deleted in the 'announcedAttribute' attribute information in this example. Because the original resource hosting CSE 1402 has deleted the name of the attribute from the 'announcedAttribute' attribute irrespective of whether the attribute de-announcement has been successfully performed for all announced resources, the original resource hosting CSE 1402 should continue the attribute de-announcement for an announced resource for which the attribute is yet to be de-announced. Also, step S1405 may be performed before step S1402 since the same response is transmitted to the originator 1401 irrespective of whether the attribute de-announcement has been successful.

Now, a description will be given of a child resource announcement procedure according to another embodiment of the present invention.

Conventionally, an announced resource may not have a child resource. This is because information about a child resource of an original resource is acquired by accessing the original resource based on link information about the original resource, provided by the announced resource. However, if the announced resource has a child resource, information about the child resource may be retrieved without the need for accessing the original resource, thereby enabling efficient resource announcement. Accordingly, an embodiment of the present invention proposes that an announced resource may also have a child resource, and the child resource is determined according to the announced resource.

Child resource types that a specific announced resource has are specified in a resource specification. For example, child resource types that an <applicationAnnc> resource has are defined in the following table. According to this table, the <applicationAnnc> resource may have, as child resources, <subscription>, <container>, <containerAnnc>, <groupAnnc>, <accessRightAnnc>, <mgmtObjAnne>, <commCapabilitiesAnnc>, and the like. That is, the child resources of the announced resource may be an announced resource type or a general resource type.

TABLE 4

| Child Resource Name of <application (AE)> | Child Resource Type | Multiplicity | Description | <applicationAnnc> Child Resource Type |
|---|---|---|---|---|
| [variable] | <subscription> | 0 . . . n | The <subscription> resource contains subscription information for its subscribed-to resource. The subscribed-to resource is the resource that has the <subscription> resource as the child resource. The <subscription> resource shall be represented as child resource of the subscribed-to resource. For example, <container> resource has <subscription> resource as a child resource (see clause 9.6.6). A <subscription> resource shall be deleted when a parent subscribed-to resource is deleted. | <subscription> |
| [variable] | <container> | 0 . . . n | This resource represents a container for data instances. It is used to share information among other entities and potentially to track the data. A <container> resource has no associated content, only attributes and child resources. | <container> or <containerAnnc> |
| [variable] | <group> | 0 . . . n | The <group> resource represents a group of resources of the same or mixed types. The <group> resource can be used to do bulk manipulations on the resources represented by the membersList attribute. The <group> resource contains an attribute that represents the members of the group and a virtual resource (the <fanOutPoint>) that allows operations to be applied to the resources represented by those members. | <groupAnnc> |

TABLE 4-continued

| Child Resource Name of <application (AE)> | Child Resource Type | Multiplicity | Description | <applicationAnnc> Child Resource Type |
|---|---|---|---|---|
| [variable] | <accessControlPolicy> | 0 . . . n | The <accessControlPolicy> resource is comprised of privileges and selfPrivileges attributes which represent a set of access control rules defining which entities (defined as accessControlOriginators) have the privilege to perform certain operations (defined as accessContolOperations) within specified contexts (defined as accessControlContexts) and are used by the CSEs in making access decision to specific resources. | <accessRightAnnc> |
| [variable] | <pollingChannel> | 0 . . . n | The <pollingChannel> resource shall represent a channel that can be used for a request-unreachable entity (i.e. an AE or a CSE which is behind NAT so it cannot receive a request from others). The request-unreachable entity creates a <pollingChannel> resource on a request-reachable CSE, and it polls any type of request(s) for itself from the <pollingChannel> hosting CSE. For example, an AE can retrieve notifications by long polling on the channel when it cannot receive notifications asynchronously from a subscription hosting CSE. When the Registrar CSE of this AE is request-unreachable, the AE should create this <pollingChannel> resource and perform long polling. | <pollingChannel> |

In the case where a specific child resource is created under an announced resource, if the child resource is not the announced resource type (if its resource type is not with suffix "Annc"), the child resource is created in a creation scheme corresponding to the resource type of the child resource. On the other hand, if the child resource created under the announced resource is the announced resource type, the resource announcement scheme described according to the present invention is used. However, if an originator transmits a creation request, the originator should transmit an accurate URI (not a CSE-ID) so that the child resource may be created under the specific announced resource.

Figure 15:
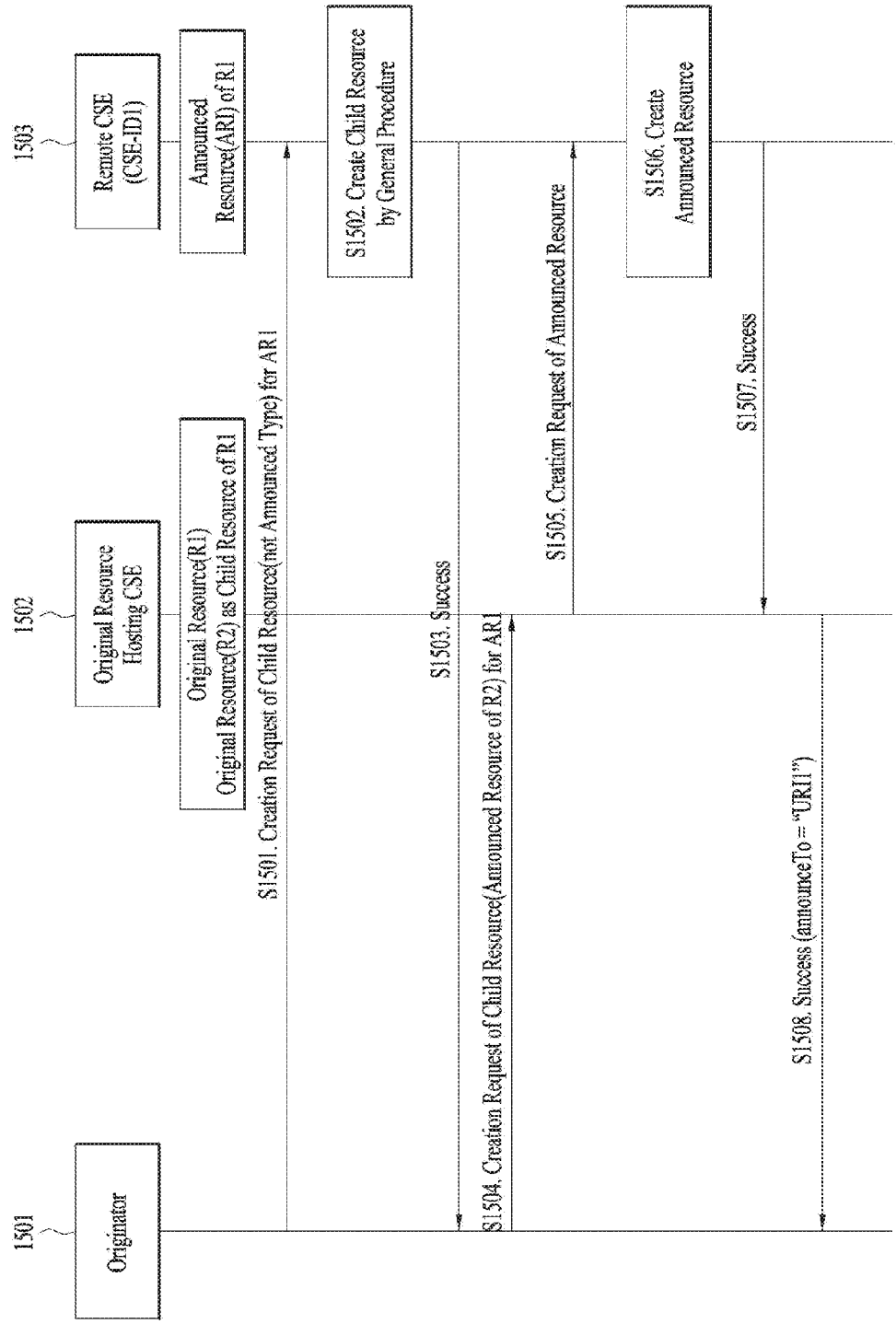
FIG. 15 is a diagram illustrating a signal flow for a procedure for creating a child resource according to an embodiment of the present invention.

FIG. 15 is a diagram illustrating a signal flow for a procedure for creating a child resource according to an embodiment of the present invention.

In regard to a setting for FIG. 15, an original resource hosting CSE 1502 has two resources. For example, the two resources may be original resources R1 and R2. R2 is a child resource of R1. R1 has been announced to a remote CSE 1503, as AR1.

S1501: An originator 1501 may transmit, to the original resource hosting CSE 1502, a request for creating a new child resource under the announced resource AR1 present in the remote CSE 1503. Since the child resource to be created is not the announced resource type, the originator 1501 requests resource creation to the remote CSE 1503. In this case, a resource creation procedure is performed according to the type of the resource to be created.

S1502 and S1503: The original resource hosting CSE 1502 may create the child resource under the announced resource AR1 according to the creation request. The original resource hosting CSE 1502 determines whether the announced resource may have a child resource of the corresponding resource type before creating the child resource. If the child resources is successfully created, the original resource hosting CSE 1502 may transmit a response indicating successful creation of the child resource to the originator 1501.

S1504: The originator 1501 may transmit, to the original resource hosting CSE 1502, a request for creating a child resource under the already-existing announced resource AR1. The request may be transmitted by an update request. The new child resource to be created is the announced resource type. The originator 1501 first determines the original resource (R2 in this example) of the new child resource. That is, the determined original resource is announced as the child resource of AR1.

Resource announcement is performed to the remote CSE 1503 using the 'announceTo' attribute of the determined original resource R2. This request should not include a CSE-ID but indicate an accurate location for the child resource by a URI.

S1505 to S1508: This operation is the same as the above-described resource announcement procedure (i.e., S1302 to S1305 in FIG. 13).

Figure 16:
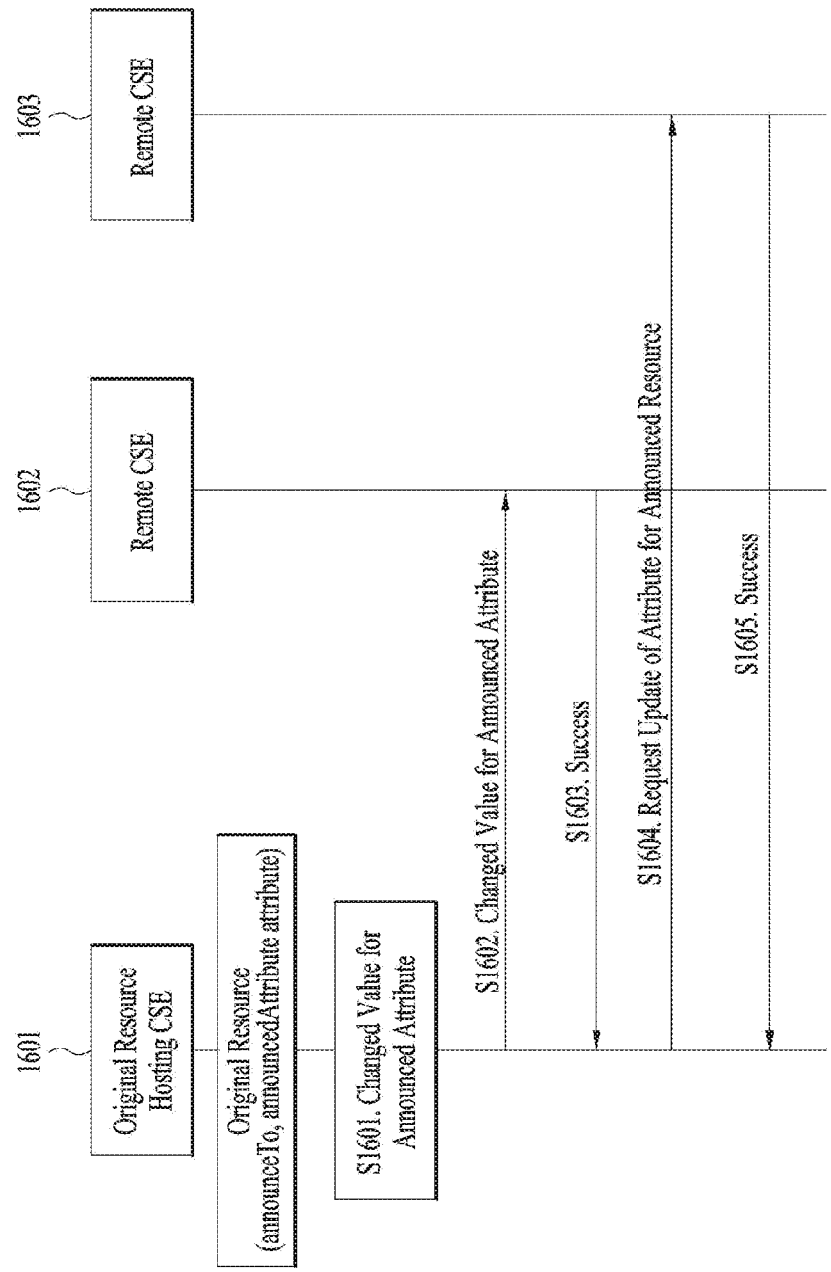
FIG. 16 is a diagram illustrating a signal flow for a procedure for synchronizing an original resource with announced resources (or attributes)

Meanwhile, announced attributes should have the same values as their original attributes. When an announced resource is created, the same value as its original resource is allocated to the announced resource. If the value of the original attribute is changed, the same changed value should be allocated to the announced attribute. The original resource hosting CSE is responsible for allocating values to announced attributes. FIG. 16 is a diagram illustrating a signal flow for a procedure for synchronizing an original resource with announced resources (or attributes).

S1601: An original resource hosting CSE 1601 may detect that a specific announced attribute has a changed value. The original resource hosting CSE 1601 determines whether a resource having the specific attribute is an announced resource and the specific attribute is also an announced attribute. If the resource has an 'announceTo' attribute and the 'announceTo' attribute has a URI, it may be determined that resource announcement has occurred. Also, if the name of the specific attribute is stored in the 'announcedAttribute' attribute, it may be determined that the specific attribute is an announced attribute, and if the specific attribute is marked with MA irrespective of an 'announcedAttribute' attribute, it may be determined that the specific attribute is an announced attribute.

S1602: If the original resource hosting CSE 1601 determines that the specific resource is an announced resource and the specific attribute of the specific resource is an announced attribute in step S1601, the original resource hosting CSE 1601 may transmit a command for updating the value of the attribute for all announced resources present in the 'announceTo' attribute to the remote CSE 1602. The updated value is the changed value of the attribute.

S1603: Upon receipt of the command, the remote CSE 1602 may update the attribute value. Then, the remote CSE 1602 may transmit a response indicating successful update to the original resource hosting CSE 1601.

The above procedure may synchronize OA attributes and MA attributes, which are available for attribute announcement.

Steps S1604 and S1605 are identical to steps S1602 and S1603, except that the receiver of the update command is another remote CSE 1603.

Figure 17:
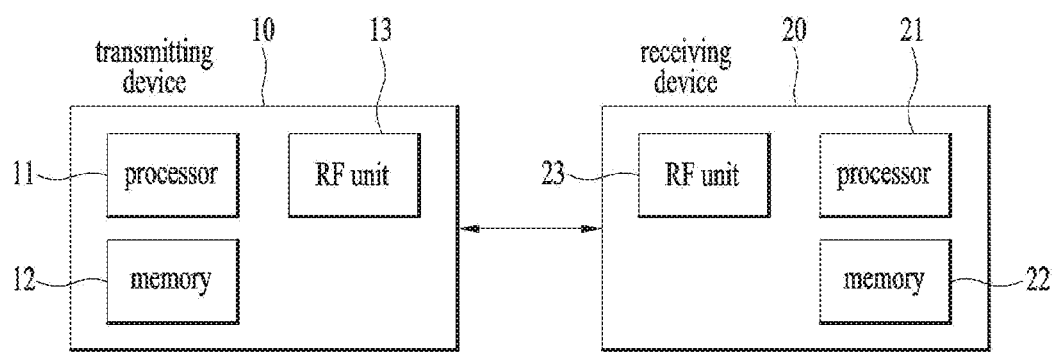
FIG. 17 is a block diagram of apparatuses for implementing an embodiment(s) of the present invention.

FIG. 17 is a block diagram of a transmitting device 10 and a receiving device 20 configured to implement exemplary embodiments of the present invention. Referring to FIG. 17, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

The invention claimed is:

1. A method for announcing an attribute of an original resource of an entity to another entity in a wireless communication system, the method comprising:

receiving an update request for an 'announcedAttribute' attribute including a list of announced attributes of the original resource, for announcing a specific attribute of the original resource, each attribute of the original resource being set to one of a mandatory announced (MA) type that is to be announced mandatorily, an optional announced (OA) type that is optionally announced according to the contents of the attribute in the original resource, and a not announced (NA) type that is not announced;

determining whether the specific attribute is the OA type; and announcing the specific attribute to all announced resources of the original resource, if the specific resource is the OA type.

2. The method according to claim 1, wherein the update request includes a name of the specific attribute.

3. The method according to claim 1, wherein the update request includes a name and a value of the specific attribute.

4. The method according to claim 1, further comprising:

receiving a response to the update request; and adding a name of the specific attribute to the 'announcedAttribute' attribute, if the response to the update request indicates successful creation.

5. The method according to claim 4, further comprising transmitting a response to the update request, after the name of the specific attribute is added to the 'announcedAttribute' attribute, wherein the response to the update request includes the 'announcedAttribute' attribute added with the specific attribute.

6. A method for, when an attribute of an original resource of an entity has been announced to another entity, de-announcing the attribute of the original resource in a wireless communication system, the method comprising:

receiving an update request for an 'announcedAttribute' attribute including a list of announced attributes of the original resource, for de-announcing a specific attribute of the original resource, each attribute of the original resource being set to a mandatory announced (MA) type that is to be announced mandatorily, an optional announced (OA) type that is optionally announced according to the contents of the attribute in the original resource, and a not announced (NA) type that is not announced;

determining whether the specific attribute is the OA type; and de-announcing the specific attribute to all announced resources of the original resource, if the specific resource is the OA type.

7. The method according to claim 6, further comprising:

receiving a response to the update request; and deleting a name of the specific attribute from the 'announcedAttribute' attribute, if the response to the update request indicates successful deletion.

8. The method according to claim 7, further comprising transmitting a response to the update request, after the name of the specific attribute is deleted from the 'announcedAttribute' attribute, wherein the response to the update request includes the 'announcedAttribute' attribute from which the specific attribute is deleted.

9. An apparatus for announcing an attribute of an original resource of an entity to another entity in a wireless communication system, the apparatus comprising:

a radio frequency (RF) unit; and a processor configured to control the RF unit, wherein the processor is configured to receive an update request for an 'announcedAttribute' attribute including a list of announced attributes of the original resource, for announcing a specific attribute of the original resource, each attribute of the original resource being set to one of a mandatory announced (MA) type that is to be announced mandatorily, an optional announced (OA) type that is optionally announced according to the contents of the attribute in the original resource, and a not announced (NA) type that is not announced, to determine whether the specific attribute is the OA type, and to announce the specific attribute to all announced resources of the original resource, if the specific resource is the OA type.

10. An apparatus for, when an attribute of an original resource of an entity has been announced to another entity, de-announcing the attribute of the original resource in a wireless communication system, the apparatus comprising:

a radio frequency (RF) unit; and a processor configured to control the RF unit, wherein the processor is configured to receive an update request for an 'announcedAttribute' attribute including a list of announced attributes of the original resource, for de-announcing a specific attribute of the original resource, each attribute of the original resource being set to a mandatory announced (MA) type that is to be announced mandatorily, an optional announced (OA) type that is optionally announced according to the contents of the attribute in the original resource, and a not announced (NA) type that is not announced, to determine whether the specific attribute is the OA type, and to de-announce the specific attribute to all announced resources of the original resource, if the specific resource is the OA type.

* * * * *